US008309651B2

(12) United States Patent
Finch et al.

(10) Patent No.: US 8,309,651 B2
(45) Date of Patent: Nov. 13, 2012

(54) BINDER COMPOSITION

(75) Inventors: William C. Finch, Ambler, PA (US);
Griffin M. Gappert, Philadelphia, PA (US); Michael D. Kelly, North Wales, PA (US); Hal C. Morris, Abington, PA (US); Xun Tang, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/313,712

(22) Filed: Nov. 24, 2008

(65) Prior Publication Data
US 2009/0156080 A1 Jun. 18, 2009

Related U.S. Application Data

(60) Provisional application No. 61/007,396, filed on Dec. 12, 2007.

(51) Int. Cl.
*C08L 31/00* (2006.01)

(52) U.S. Cl. ......... 524/556; 428/375; 428/500; 442/374

(58) Field of Classification Search ................. 428/221, 428/292.1, 297.7, 327, 375, 500; 442/374; 524/556
See application file for complete search history.

(56) References Cited

U.S. PATENT DOCUMENTS

| 4,076,917 | A | | 2/1978 | Swift et al. | |
|---|---|---|---|---|---|
| 5,143,582 | A | * | 9/1992 | Arkens et al. | 162/135 |
| 5,214,101 | A | | 5/1993 | Pettit et al. | |
| 5,661,213 | A | | 8/1997 | Arkens et al. | |
| 5,718,728 | A | | 2/1998 | Arkens et al. | |
| 5,895,804 | A | * | 4/1999 | Lee et al. | 525/54.3 |
| 6,071,994 | A | * | 6/2000 | Hummerich et al. | 524/247 |
| 6,114,464 | A | | 9/2000 | Reck et al. | |
| 6,194,512 | B1 | * | 2/2001 | Chen et al. | 524/594 |
| 6,299,936 | B1 | | 10/2001 | Reck et al. | |
| 7,199,179 | B2 | * | 4/2007 | Clamen et al. | 524/560 |
| 7,399,818 | B2 | * | 7/2008 | Bromm et al. | 526/317.1 |
| 2005/0214534 | A1 | * | 9/2005 | Adamo et al. | 428/375 |
| 2006/0029786 | A1 | | 2/2006 | Wang et al. | |
| 2007/0010651 | A1 | * | 1/2007 | Finch et al. | 528/310 |
| 2007/0012414 | A1 | | 1/2007 | Kajander et al. | |
| 2007/0059513 | A1 | | 3/2007 | Yu et al. | |
| 2007/0148430 | A1 | | 6/2007 | Agrawal | |
| 2007/0282065 | A1 | * | 12/2007 | Weinstein | 525/64 |
| 2007/0292619 | A1 | * | 12/2007 | Srinivasan et al. | 427/384 |

FOREIGN PATENT DOCUMENTS

| EP | 1 801 278 A1 | 6/2007 |
|---|---|---|
| EP | 1 892 273 A | 2/2008 |
| WO | WO 2006063802 A2 * | 6/2006 |

* cited by examiner

*Primary Examiner* — David W Wu
*Assistant Examiner* — Marie Reddick
(74) *Attorney, Agent, or Firm* — Andrew E. C. Merriam

(57) ABSTRACT

A binder composition comprising an emulsion copolymer, and a polyol crosslinker.

8 Claims, No Drawings

BINDER COMPOSITION

This application claims priority and is based on U.S. Provisional Application 61/007,396 filed Dec. 12, 2007.

This invention is a composition useful for binding nonwoven fibers for a variety of applications.

Wallboard formed of a gypsum core sandwiched between facing layers is used in the construction of most modern buildings. In its various forms, the material is employed as a surface for walls and ceilings and the like, both interior and exterior. It is relatively easy and inexpensive to install, finish, and maintain, and in suitable forms, is relatively fire resistant. Gypsum wallboard and gypsum panels are traditionally manufactured by a continuous process. In this process, a gypsum slurry is first generated in a mechanical mixer by mixing at least one of anhydrous calcium sulfate ($CaSO_4$) and calcium sulfate hemihydrate ($CaSO_4 \cdot \frac{1}{2}H_2O$, also known as calcined gypsum), water, and other substances, which may include set accelerants, waterproofing agents, reinforcing minerals, glass fibers, and the like. The gypsum slurry is normally deposited on a continuously advancing, lower facing sheet. Various additives, e.g. cellulose and glass fibers, are often added to the slurry to strengthen the gypsum core once it is dry or set. Starch is frequently added to the slurry in order to improve the adhesion between the gypsum core and the facing. A continuously advancing upper facing sheet is laid over the gypsum and the edges of the upper and lower facing sheets are pasted to each other with a suitable adhesive. The facing sheets and gypsum slurry are passed between parallel upper and lower forming plates or rolls in order to generate an integrated and continuous flat strip of unset gypsum sandwiched between the sheets. Such a flat strip of unset gypsum is known as a facing or liner. The strip is conveyed over a series of continuous moving belts and rollers for a period of several minutes, during which time the core begins to hydrate back to gypsum ($CaSO_4 \cdot 2H_2O$). The process is conventionally termed "setting," since the rehydrated gypsum is relatively hard. Once the gypsum core has set sufficiently, the continuous strip is cut into shorter lengths or even individual boards or panels of prescribed length.

After the cutting step, the gypsum boards are fed into drying ovens or kilns so as to evaporate excess water. Inside the drying ovens, the boards are blown with hot drying air. After the dried gypsum boards are removed from the ovens, the ends of the boards are trimmed off and the boards are cut to desired sizes. The boards are commonly sold to the building industry in the form of sheets nominally 4 feet wide and 8 to 12 feet or more long and in thicknesses from nominally about ¼ to 1 inches, the width and length dimensions defining the two faces of the board.

In some cases, manufacturers of the gypsum boards use paper, such as kraft paper to form the gypsum board facing sheets. While paper is desirable due to its low cost, there are some disadvantages associated with its use. For example, many applications demand water resistance that paper facing cannot provide. Upon exposure to water either directly in liquid form or indirectly through exposure to high humidity, paper is highly prone to degradation, such as by delamination, that substantially compromises its mechanical strength. Further, gypsum products typically rely on the integrity of the facing as a major contributor to their structural strength. Consequently, paper-faced products are generally not suited for exterior or other building uses in which exposure to moisture conditions is presumed. In addition, growing attention is being given to the issue of mold and mildew growth in building interiors and the potential adverse health impact such activity might have on building occupants. The paper facing of gypsum board contains wood pulp and other organic materials that may act in the presence of moisture or high humidity as nutrients for such microbial growth. Additionally, paper-faced gypsum board lacks flame resistance. In a building fire, the exposed paper facing quickly burns away. Although the gypsum itself is not flammable, once the facing is gone the board's mechanical strength is greatly impaired. At some stage thereafter the board is highly likely to collapse, permitting fire to spread to the underlying framing members and adjacent areas of a building, with obvious and serious consequences. A board having a facing less susceptible to burning would at least survive longer in a fire and thus be highly desirable in protecting both people and property.

In light of the disadvantages associated with using paper facing sheets, other types of material are often used as the facing sheets. One such material is a non-woven mat made for example from fibrous material such as a glass, mineral wool or polyester. Oftentimes, the mat is made of non-woven glass fibers randomly oriented and secured together with a binder. These glass mats, when used as facings, provide increased dimensional stability in the presence of moisture, biological resistance, and greater physical and mechanical properties than normal paper faced gypsum boards. The problems associated with the surface roughness of the boards may be decreased by applying a continuous coating. Typical coating compositions are well known in the art (see, for example U.S. Patent Publication No. 2005/0233657). A disadvantage associated with conventional binders for nonwoven fibers is that they are typically formaldehyde based binders.

U.S. Pat. No. 6,299,936 discloses a thermally curable aqueous composition comprising: (A) at least one polymer, obtained by free-radical polymerization, which comprises $\leq 5\%$ by weight of an $\alpha,\beta$-ethylenically unsaturated mono- or dicarboxylic acid, in copolymerized form; (B) at least one polymer, obtained by free-radical polymerization, which comprises $\geq 15\%$ by weight of an $\alpha,\beta$-ethylenically unsaturated mono- or dicarboxylic acid, in copolymerized form; and (C) at least one alkanolamine having at least two hydroxyalkyl groups.

There remains a need for alternative binders that address the abovementioned disadvantages associated with conventional facing sheets. It is an object of the present invention to provide a binder composition that provides at least one of the following desirable attributes to a gypsum board or other article containing nonwoven fibers: flame resistance, microbial growth resistance, formaldehyde free or cost effective. It is a further object of the invention to provide a binder composition which provides improvements over conventional binders in at least one of: dry strength, wet strength, and hot/dry strength required for handling, cutting, and installation of the gypsum board, or for the performance of other articles containing nonwoven fibers.

One aspect of the present invention is a binder composition comprising: (a) at least one polycarboxy emulsion copolymer comprising from 10% to 25% by weight of a carboxy acid monomer, wherein said copolymer has a measured Tg of from 40° C. to 70° C., and a total weight solids of no less than 40%; and (b) at least one polyol crosslinker having a molecular weight of less than 700, wherein said polyol crosslinker comprises a primary hydroxy group and at least one additional hydroxy group, wherein the ratio of primary hydroxy group equivalents to carboxy group equivalents is from 0.25 to 2.0.

Another aspect of the present invention is a nonwoven mat comprising nonwoven fibers bound by the binder composition of the first aspect of the invention.

The binder of the present invention contains at least one polycarboxy emulsion copolymer and at least one polyol crosslinker. The polycarboxy emulsion copolymer includes, as copolymerized units from 10% to 25%, preferably from 12% to 20%, most preferably 14% to 17%, by weight, based on the weight of the emulsion copolymer solids, of a carboxy acid monomer bearing a carboxylic acid group, anhydride group or salt thereof, or hydroxyl-group. Suitable carboxy monomers include, for example, ethylenically unsaturated carboxylic acid monomers such as, for example, methacrylic acid, acrylic acid, crotonic acid, fumaric acid, maleic acid, 2-methyl maleic acid, itaconic acid, 2-methyl itaconic acid, a,b-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof. In a preferred embodiment of the invention, the carboxy monomer may be acrylic acid or methacrylic acid.

The carboxy acid may be copolymerized with any suitable monomer. In one embodiment of the invention, the carboxy acid is copolymerized with at least one ethylynically unsaturated monomer, such as an acrylic ester monomer. Suitable acrylic ester monomers include, for example, methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; (meth)acrylamide or substituted (meth)acrylamides; styrene or substituted styrenes; butadiene; vinyl acetate or other vinyl esters; acrylonitrile or methacrylonitrile; and the like.

The polycarboxy emulsion copolymer has a Tg of from 40° C. to 70° C., preferably from 45° C. to 65° C., more preferably from 50° C. to 60° C., where the Tg is as measured by differential scanning calorimetry per ASTM 3418/82, midpoint temperature; cell calibration using an indium reference for temperature and enthalpy.

The polycarboxy emulsion copolymer has a total weight solids of no less than 40% preferably from 40% to 60%, more preferably from 45% to 55%.

In one embodiment of the invention, the emulsion copolymer has a weight average molecular weight of from 5,000 to 1,000,000, preferably from 20,000 to 750,000, and most preferably from 30,000 to 600,000.

In another embodiment of the invention, the emulsion copolymer particles may have a particle size of from 50 to 300 nm, preferably from 75 to 225 nm, more preferably from 125 to 175 nm.

The polycarboxy emulsion copolymer may be made by any conventional emulsion polymerization, which emulsion processes are well known by those of ordinary skill in the art.

During the emulsion polymerization process, chain transfer agents such as mercaptans, polymercaptans, and halogen compounds may be used in the polymerization mixture in order to moderate the molecular weight of the copolymer composition. Generally, from 0% to 10% by weight, based on the weight of the polymeric binder, of $C_4$-$C_{20}$ alkyl mercaptans, mercaptopropionic acid, or esters of mercaptopropionic acid, can be used.

Low levels of multi-ethylenically-unsaturated monomers can be used in order to produce low levels of pre-crosslinking, such as, for example, allyl methacrylate, diallyl phthalate, 1,4-butylene glycol dimethacrylate, 1,6-hexanedioldiacrylate, and the like. In those embodiments of the invention where the multi-ethylenically-unsaturated monomers are used, it is preferred that they be used as a level of from 0.01% to 5%, by weight based on the weight of copolymer.

The binder of the invention further contains at least one polyol crosslinker. By "polyol" is meant herein, a compound containing at least two hydroxyl groups. In the binder of this invention, the ratio of primary hydroxyl group equivalents (contributed by the polyol) to carboxy (—COOH) group equivalents (contributed by the emulsion copolymer, the soluble copolymer and the polybasic carboxylic acid) is from 0.25 to 2.0, preferably from 0.4 to 1.75, more preferably from 0.5 to 1.6. In those embodiments of the invention where the polyol is triethanolamine, it is preferred that the hydroxy to carboxy equivalents ratio is from 0.25 to 1.0, more preferably from 0.4 to 0.85, and even more preferably from 0.5 to 0.7. In those embodiments of the invention where the polyol is glycerol, it is preferred that the hydroxy to carboxy equivalents ratio is from 1.0 to 2.0, more preferably from 1.25 to 1.75, and even more preferably from 1.4 to 1.6, where the glycerol has two active hydroxyl groups.

The polyol crosslinker has a molecular weight of less than 700, preferably less than 500, and more preferably less than 250.

Examples of suitable polyols include, for example triethanolamine, a hydroxyamide group-containing polyol, glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, β-hydroxyalkylamides such as, for example, bis-[N,N-di(β-hydroxyethyl)]adipamide, as may be prepared according to the teachings of U.S. Pat. No. 4,076,917, hereby incorporated herein by reference, or it may be an addition polymer containing at least two hydroxyl groups such as, for example, polyvinyl alcohol, partially hydrolyzed polyvinyl acetate, and homopolymers or copolymers of hydroxyethyl (meth) acrylate, hydroxypropyl (meth)acrylate, and the like. In a preferred embodiment of the invention, the polyol is triethanolamine or glycerol.

Useful hydroxyamides for this invention include those described in Swift U.S. Pat. No. 4,076,917, and Arkens EP Patent No. 0,512,732. In those embodiments of the invention where the polyol is a hydroxamide, it is preferred that it is a reactive β-hydroxyamide group-containing polyol of the following formula (I), which is the reaction product of a lactone or other cyclic ester and an alkanolamine:

(I)

in which formula, R and R" independently represent H, or any monovalent $C_1$ to $C_{18}$ linear or branched alkyl, which alkyl may comprise one or two aryl or cycloalkyl groups, or be substituted with one or more hydroxyl, amine, thiol, amide, carboxyl or alkenyl groups, or combinations thereof; R' represents either a covalent bond or a divalent $C_1$ to $C_5$ alkylene radical where the alkylene radical may bear alkyl group substituents; y is the integer 1 or 2; x is 0 or 1, such that (x+y)=2;

The reactive β-hydroxyamide group-containing polyol may be the reaction product of one or more alkanolamine with one or more lactone or lactide. Suitable alkanolamines include for example mono- or di-ethanolamines, as well as any $C_1$ to $C_{18}$ linear or branched α-alk(en)yl substituted mono- or di-ethanolamines, wherein the alk(en)yl substituent may contain aryl, cycloalkyl and alkenyl groups. Examples of substituted alkanolamines include for example mono- or di-isopropanolamines and other mono-(1-alk(en)yl)ethanol amine or di-(1-alk(en)yl)ethanol amine. Suitable lactones include for example lactides, glycolides, and lactones of any $C_2$ to $C_8$ hydroxycarboxylic acids, as well as dimers and oligomers thereof. Preferred lactones include for example any comprising 5 to 7 membered rings, such as ε-caprolactone, γ-butyrolactone and any α-$C_1$ to $C_{18}$ alk(en)yl mono-substituted forms thereof, such as α-methyl-ε-caprolactone or α-methyl-γ-butyrolactone.

The reactive β-hydroxyamide group containing polyol (I) may be produced by simple mixing of the lactone and alkanolamine reactants, and, if needed, heating, such as when reacting dimers or oligomers of lactones. Preferably, the reactive β-hydroxyamide group containing polyol(s) (I) are produced in a "dry" or anhydrous mixture of the reactants.

Desirable β-hydroxyamide polyols can be produced by reaction of lactones or lactides with alkanolamines. Specific, non-limiting, examples of this reaction are the reaction of either caprolactone or butyrolactone with diethanolamine to form their corresponding β-hydroxyamide products. No highly volatile organic by-products are formed by this reaction. Potential by-products, including the acid generated by hydrolysis of the lactone, if non-anhydrous conditions are used, and un-reacted diethanolamine, can cure into the thermoset network. Accordingly, the curable compositions of the present invention resist exuding from substrates treated with them.

The hydroxyamide is preferably present in an amount of 1%-30% by weight of the total solids in the binder, more preferably 5%-15%.

In one embodiment of the invention, the polycarboxy emulsion copolymer is not blended with any other polymers. In another embodiment of the invention, the binder composition does not include any polymers containing less than 10% by weight, preferably less than 6% by weight, of a carboxy acid monomer.

The binder of this invention can optionally include a soluble addition (co)polymer, containing at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid; ethylenically unsaturated anhydrides such as, for example, maleic anhydride, itaconic anhydride, acrylic anhydride, and methacrylic anhydride; and salts thereof, at a level of at least 70% by weight based on the weight of the addition (co)polymer, may be used. Additional ethylenically unsaturated monomers may include acrylic ester monomers, including methyl (meth)acrylate, ethyl (meth)acrylate, butyl (meth)acrylate, 2-ethylhexyl acrylate, and the like.

The soluble addition (co)polymer containing at least two carboxylic acid groups, anhydride groups, or salts thereof may have a molecular weight from about 1,000 to 150,000.

The soluble addition (co)polymer containing at least two carboxylic acid groups, anhydride groups, or salts thereof may be used at a level from 0%-30% by weight based on the total weight of the polycarboxy emulsion copolymer.

In one embodiment of the invention, the binder composition further contains at least one low molecular weight polybasic carboxylic acid, anhydride or salt thereof having a molecular weight of 1000 or less, preferably 500 or less, and most preferably 200 or less. "Polybasic" means having at least two reactive acid or anhydride functional groups. Examples of suitable low molecular weight polybasic carboxylic acids and anhydrides include, for example, maleic acid, maleic anhydride, fumaric acid, succinic acid, succinic anhydride, sebacic acid, azelaic acid, adipic acid, citric acid, glutaric acid, tartaric acid, itaconic acid, trimellitic acid, hemimellitic acid, trimesic acid, tricarballytic acid, 1,2,3,4-butanetetracarboxylic acid, pyromellitic acid, oligomers of carboxylic acid, and the like. Preferably, the low molecular weight polybasic carboxylic acid, anhydride or salt thereof is pre-cooked, under reactive conditions, with the polysaccharide or vegetable protein, prior to mixing with the polycarboxy emulsion copolymer. Most preferably, citric acid is used as the polybasic acid, and hydroxyethylated corn starch is used as the polysaccharide.

The binder of this invention can contain, in addition, conventional treatment components such as, for example, emulsifiers; pigments; fillers or extenders; anti-migration aids; curing agents; coalescents; surfactants, particularly nonionic surfactants; spreading agents; mineral oil dust suppressing agents; biocides; plasticizers; organosilanes; anti-foaming agents such as dimethicones, silicone oils and ethoxylated nonionics; corrosion inhibitors, particularly corrosion inhibitors effective at pH<4 such as thioureas, oxalates, and chromates; colorants; antistatic agents; lubricants; waxes; antioxidants; coupling agents such as silanes, particularly Silquest™ A-187 (manufactured by GE Silicones—OSi Specialties, located in Wilton Conn.); polymers not of the present invention; and waterproofing agents such as silicones and emulsion polymers, particularly hydrophobic emulsion polymers containing, as copolymerized units, greater than 30% by weight, based on the weight of the emulsion polymer solids, ethylenically-unsaturated acrylic monomer containing a C5 or greater alkyl group.

Additionally, this invention includes a nonwoven mat containing nonwoven fibers that have been bound by the binder composition of the invention. The fibers may be employed in many forms, including individual fibers, strands containing plural fibers, and rovings. The glass fibers may be formed by drawing molten glass into filaments through a bushing or orifice plate and applying an aqueous sizing composition containing lubricants, coupling agents, and film-forming binder resins to the filaments. The sizing composition provides protection to the fibers from interfilament abrasion and promotes compatibility between the glass fibers and the matrix in which the glass fibers are to be used. After the sizing composition is applied, the wet fibers may be gathered into one or more strands, chopped, and collected as wet chopped fiber strands.

In one embodiment of the invention, the nonwoven mat may be made by forming a web of wet or dry nonwoven fibers, and transferring the web to a moving screen running through a binder application station where the binder composition of the invention may be applied to the web. The binder may be applied to the web by any suitable means including, for example, air or airless spraying, padding, saturating, roll coating, curtain coating, beater deposition, coagulation or dip and squeeze application. The resultant saturated wet bindered web laying on a supporting wire or screen may be run over one or more vacuum boxes to remove enough binder to achieve the desired binder content in the mat.

In a different embodiment of the invention, the nonwoven mat may be formed by a wet-laid process, whereby wet chopped glass fibers may be deposited onto a conveyor from a fiber feed system. The chopped glass fibers may be placed into a pulper or mixing tank that contains various surfactants, viscosity modifiers, defoaming agents, and/or other chemical agents with agitation to form a chopped glass fiber slurry. The conglomeration of chemicals in the mixing tank is commonly termed "white water". The glass fiber slurry may be passed through a machine chest and a constant level chest to further disperse the fibers in the whitewater. The chopped glass slurry may then be transferred from the constant level chest, and pumped via a fan pump to a head box. The glass fiber slurry may then deposited onto a moving screen or wire where a substantial portion of the water from the slurry may be removed via gravity through head pressure within the headbox to form a web. Excess whitewater may be removed and deposited into a silo. Whitewater may be further removed from the web by a conventional vacuum or air suction system. The binder composition may then be applied to the web by a binder applicator such as, for example, a curtain coater. Excess binder may be vacuumed from the web by a vacuum or air suction apparatus, and deposited into a binder supply tank.

The binder level in the nonwoven mats may vary, depending upon the application for which the mat is intended to be used. After application to the nonwoven mat, the binder composition may be cured by the application of heat.

After the binder has been cured, it may be coated with a suitable composition to deliver a specific desired additive or to obtain specific desired properties such as better touch, smoothness or strength. Suitable coatings are well known in the art.

As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures.

As used herein, the phrase "aqueous" or "aqueous solvent" includes water and mixtures composed substantially of water and water-miscible solvents.

As used herein, the phrase "based on the total weight of binder solids" refers to weight amounts of any given ingredient in comparison to the total weight amount of all the non-water ingredients in the binder (e.g., polyacids, emulsion copolymers, polyols and the like). Binders of this invention can be aqueous or dry (with water optionally added prior to application to a substrate).

As used herein, unless otherwise indicated, the word "copolymer" includes, independently, copolymers, terpolymers, block copolymers, segmented copolymers, graft copolymers, and any mixture or combination thereof. (Co) polymer means homopolymer or copolymer.

As used herein, the phrase "emulsion polymer" means polymers dispersed in an aqueous medium that has been prepared by emulsion polymerization.

As used herein, the term "(meth)acrylate" means acrylate, methacrylate, and mixtures thereof and the term "(meth) acrylic" used herein means acrylic, methacrylic, and mixtures thereof.

As used herein, the phrases "($C_3$-$C_{12}$)-" or "($C_3$-$C_6$)-" and the like refer to organic compounds or structural portions of organic compounds containing 3 to 12 carbon atoms and 3 to 6 carbon atoms, respectively.

As used herein, unless otherwise indicated, the phrase "molecular weight" refers to the weight average molecular weight of a polymer as measured by gel permeation chromatography (GPC). Gel permeation chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

The binders of this invention are useful to bind non-woven fibers, which fibers may be formed in a non-woven web, among other things. "Non-woven web" refers to any article or sheet-like form made from natural and/or synthetic fibers wherein the fibers are aligned in a random or semi-random order (i.e., not deliberately ordered). One skilled in the art understands that formation of some order occurs during the web forming process (primarily in the machine direction); however, this is completely different from the ordering obtained from traditional weaving or knitting processes. Suitable fibers for use in forming the web include, but are not limited to, fiberglass, cellulose, modified cellulose (cellulose acetate), cotton, polyesters, rayon, polyacrylonitrile (PAN), polylactic acid (PLA), polycaprolactone (PCL), polyolefins and bi-component fiber comprising two or more fiber-forming polymers such as polypropylene and polyethylene terphthalate and the like. Included in the definition of nonwoven webs suitable for use with this invention are porous films prepared by the action of chemical or mechanical processing (e.g., apertured films). The present invention will find utility with any weight of non-woven web and will depend greatly on the requirements of the particular application. Manufacturing processes for making non-woven webs are well known in the art. These include, for example, wet-laid, air-laid (dry laid), spunbond, spunlace, meltblown and needle punch. The webs may have any base weight (i.e., the weight of the web before any coating or treatments are applied) suitable for their intended use. In one embodiment of the invention, the web has a base weight of less than 100 grams per square meter (gsm). In a different embodiment of the invention, the web will have a base weight of less than about 20 gsm.

In a preferred embodiment of the invention, the binder composition is formaldehyde-free. By "formaldehyde free" is meant herein substantially free from added formaldehyde, and not liberating substantial formaldehyde as a result of drying and/or curing. To minimize the formaldehyde content of the aqueous composition, it is preferred, when preparing the polycarboxy emulsion copolymer, to use polymerization adjuncts and additives such as, for example, initiators, reducing agents, chain transfer agents, curing agents, biocides, surfactants, emulsifiers coupling agents, anti-foaming agents, dust suppressing agents, fillers and the like, which are themselves free from formaldehyde, do not generate formaldehyde during the polymerization process, and do not generate or emit formaldehyde during the treatment of heat-resistant nonwovens.

In one embodiment of this invention, the binder composition further contains a phosphorous-containing accelerator such as those disclosed in U.S. Pat. No. 6,136,916. The phosphorous-containing accelerator may be a polymer bearing phosphorous-containing groups such as, for example, an acrylate polymer formed in the presence of sodium hypophosphite by addition polymerization, but a separate compound from any soluble polymer that may serve as part of the binder composition of the present invention. In a preferred embodiment of the invention, the accelerator may be sodium hypophosphite, sodium phosphite, or a mixture thereof, with sodium phosphate being preferred, at a weight percent, based on total carboxyl acid weight from the emulsion polymer and the soluble polymer (if it is used), of from 1% to 20%, preferably from 5% to 15%. The one or more phosphorous-containing accelerator may be used at a level of from 0 wt. % to 40 wt. %, preferably up to 25 wt. %, more preferably up to 20 wt. %, even more preferably up to 15 wt. %, or still more preferably up to 12 wt. %, based on the total weight of binder solids. The phosphorous-containing accelerators may be used in the amount of 0.1 wt. % or more, based on the total weight of binder solids.

In another embodiment, the binder composition may contain one or more strong acids, wherein the strong acid has a pKa of ≤3.0. The binder composition may contain up to 0.2 equivalents of a strong acid, relative to the equivalents of total carboxylic acid from the emulsion polymer and the optional soluble polymer, such as from 0.01 to 0.18 equivalents. The strong acid may be a mineral acid, such as, for example, sulfuric acid, or an organic acid, such as, for example, a sulfonic acid. Mineral acids are preferred.

In drying (if applied in aqueous form) and curing the binder composition, the duration, and temperature of heating will affect the rate of drying, ease of processing or handling, and property development of the article bearing the binder. Suitable heat treatment at 100° C. or more, and up to 400° C., may be maintained for from 3 seconds to 15 minutes. Preferably, heat treatment temperatures range from 150° C. or higher; more preferably from 150° C. to 225° C., even more preferably from 150° C. to 200° C. In those embodiments of the invention where a phosphorous-containing accelerator is used, heat treatment temperatures of up to 150° C. are preferred. Where the substrate upon which the binder composition is applied contains wood, temperatures of 100° C. to 220° C., are preferred.

In one embodiment of the invention, drying and curing of the binder composition may be performed in two or more distinct steps, if desired. For example, the binder composition can be first heated at temperatures and for times sufficient to substantially dry, but not to substantially cure the composition, followed by heating for a second time, at higher temperatures and/or for longer periods of time, to effect curing. Such procedures, referred to as "B-staging," can be used to provide binder-treated nonwovens, for example, in roll form, which can be cured later, with or without forming or molding into a particular configuration, concurrent with the curing process.

The binder composition is suitable for binding nonwoven fibers, such as, for example, glass fibers, polyester fibers, rayon fibers, nylon fibers, superabsorbent fibers, and the like, thereby forming a nonwoven web or fabric.

EXAMPLES

These examples illustrate specific binder compositions of this invention and ones that compare to such compositions.

Example 1 and Comparative Example 2

Emulsion Copolymer Synthesis

Example 1

A 5-liter round-bottom flask equipped with a paddle stirrer, thermocouple, nitrogen inlet, and reflux condenser was charged with 876.4 grams of deionized water, 24.2 grams of sodium hypophosphite monohydrdate, 28.5 grams of a sodium lauryl ether sulfate surfactant solution (30%), 3.1 grams of sodium hydroxide, and 0.058 grams of an inhibitor. The mixture was heated to 79° C.

A monomer emulsion was prepared using 459.7 grams of deionized water, 89.2 grams of a sodium lauryl ether sulfate surfactant solution (30%), 553.9 grams of butyl acrylate, 969.7 grams of styrene, and 268.9 grams of acrylic acid. A 97.0 gram aliquot of this monomer emulsion was added to the reaction flask, followed by a solution of 7.4 grams of ammonium persulfate dissolved in 33.3 grams of deionized water. After an exotherm and while maintaining a reaction temperature of 86° C., the monomer emulsion and a separate solution of 7.4 grams of ammonium persulfate in 156.9 grams of deionized water were gradually added over a total time of 130 minutes. After these additions were complete a solution of 42.6 grams of sodium hydroxide dissolved in 397.4 grams deionized water was added. A solution of 0.022 grams of ferrous sulfate heptahydrate in 4.8 grams deionized water and a solution of 0.022 grams of ethylene diamine tetraacetate, tetra sodium salt dissolved in 4.8 grams of deionized water was added to the reaction mixture. A solution of 7.9 grams of aqueous tert-butylhydroperoxide (70%) diluted with 31.2 grams deionized water and a solution of 5.3 grams of sodium bisulfite dissolved in 62.8 grams of deionized water were gradually added to the reaction mixture. After a brief hold, a solution of 7.9 grams of aqueous tert-butylhydroperoxide (70%) diluted with 31.2 grams deionized water and a solution of 5.3 grams of sodium bisulfite dissolved in 62.8 grams of deionized water were gradually added to the reaction mixture. After addition of these solutions was complete, 47.6 grams of deionized water was added, and the reaction mixture was cooled to room temperature. When the reaction mixture was cool, a biocide was added and the latex was filtered.

The resulting latex had a solids content of roughly 46.0%. As shown in Table A, the copolymer emulsion of Example 1 had a Tg of 55° C.

Comparative Example 2

A 5-gallon stainless steal reactor equipped with a stirrer, thermocouple, nitrogen inlet, and reflux condenser was charged with 3221.7 grams of deionized water, 109.1 grams of sodium hypophosphite monohydrdate, 128.4 grams of a sodium lauryl ether sulfate surfactant solution (30%), 13.9 grams of sodium hydroxide, and 0.26 grams of an inhibitor. The mixture was heated to 79° C.

A monomer emulsion was prepared using 2257.7 grams of deionized water, 401.5 grams of a sodium lauryl ether sulfate surfactant solution (30%), 4220.3 grams of butyl acrylate, 2638.7 grams of styrene, and 1210.4 grams of acrylic acid. A 443.1 gram aliquot of this monomer emulsion was added to the reaction flask, followed by a solution of 33.2 grams of ammonium persulfate dissolved in 167.6 grams of deionized water. After an exotherm and while maintaining a reaction temperature of 86° C., the monomer emulsion and a separate solution of 33.2 grams of ammonium persulfate in 707.4 grams of deionized water were gradually added over a total time of 130 minutes. After these additions were complete a solution of 192.6 grams of sodium hydroxide dissolved in 2164.7 grams deionized water was added. A solution of 0.097 grams of ferrous sulfate heptahydrate in 32.4 grams deionized water and a solution of 0.098 grams of ethylene diamine tetraacetate, tetra sodium salt dissolved in 32.4 grams of deionized water was added to the reaction mixture. A solution of 35.6 grams of aqueous tert-butylhydroperoxide (70%) diluted with 158.8 grams deionized water and a solution of 23.7 grams of sodium bisulfite dissolved in 301.0 grams of deionized water were gradually added to the reaction mixture. After a brief hold, a solution of 35.6 grams of aqueous tert-butylhydroperoxide (70%) diluted with 158.8 grams deionized water and a solution of 23.7 grams of sodium bisulfite dissolved in 301.0 grams of deionized water were gradually added to the reaction mixture. After addition of these solutions was complete, 109.9 grams of deionized water was added, and the reaction mixture was cooled to room temperature. When the reaction mixture was cool, a biocide was added and the latex was filtered.

The resulting latex had a solids content of roughly 44.7%. As shown in Table A, the copolymer emulsion of Comparative Example 2 had a Tg of 15° C.

TABLE A

Tg of Polymer Emulsions (Example 1 and Comparative Example 2) Prepared from Monomer Emulsions of Table A.

|  | Example 1 (g) | Comparative Example 2 (g) |
|---|---|---|
| Monomer emulsion used to prepare polymer emulsion | Ex. 1 | Ex. 2 |
| Tg of emulsion polymer | 55 | 15 |

Example 3

Preparation of Polyol Crosslinker (β-Hydroxyamide #1-Reaction Product of ε-Caprolactone and Diethanolamine)

To a 1 L flask equipped with a condenser, a thermocouple, and a mechanical stirrer, was added 157.5 grams (1.5 moles) of diethanolamine (DEOA). Starting at room temperature under one atmosphere of nitrogen, and without external heating, 171.2 grams (1.5 moles) of ε-caprolactone was added to the reaction flask by pipette in small aliquots over the course of 1 hour. The reaction mixture exhibited a slight exotherm to 31° C. After the addition of ε-caprolactone was complete the reaction mixture was stirred for another hour.

Examples 4-10 and Comparative Examples 11-14

Preparation of Binder Compositions

The ingredients of the binder composition were combined in the amounts shown in Table B. In a continuously stirred 5 liter flask, the polyol was added to the latex followed by the accelerant, and then water.

TABLE B

Binder Compositions

| Example | g. | Polymer Emulsion | g. | Polyol | g. | Post-Add Accelerant | g. H₂O |
|---|---|---|---|---|---|---|---|
| 4 | 485 | Ex. 1 | 15.7 | hydroxyamide (Ex. 3) | 8.2 | SHP | 393 |
| 5 | 455 | Ex. 1 | 29.4 | hydroxyamide (Ex. 3) | 7.7 | SHP | 413 |
| 6 | 475 | Ex. 1 | 22.2 | glycerol | 8.1 | SHP | 394 |
| 7 | 460 | Ex. 1 | 32.3 | glycerol | 7.8 | SHP | 408 |
| 8 | 465 | Ex. 1 | 43.6 | glycerol | 7.9 | SHP | 440 |
| 9 | 495 | Ex. 1 | 11.1 | triethanolamine | 8.4 | SHP | 386 |
| 10 | 20 | Ex. 1 | 15.2 | triethanolamine | 8.8 | SHP | 416 |
| Comp. Ex. 11 | 20 | Ex. 1 | | None | 8.8 | SHP | 371 |
| Comp. Ex. 12 | 430 | Comp. Ex. 2 | 10.1 | triethanolamine | 7.7 | SHP | 373 |
| Comp. Ex. 13 | 468.8 | Rhoplex™ GL-618 | | None | | None | 431.25 |
| Comp. Ex. 14 | 347.9 | Rhoplex™ GL-618 | | None | | None | 423.13 |
|  | 130 | QRXP-1629S |  |  |  |  |  |

NOTE:

SHP is sodium hypophosphite, added as 45% solution by weight in water.

Rhoplex GL-618 is an emulsion polymer manufactured by Rohm and Haas Company headquartered in Philadelphia, PA.

QRXP-1629S is a solution polymer having SHP in the polymer backbone, manufactured by Rohm and Haas Company headquartered in Philadelphia, PA.

Preparation Of Nonwoven Fiber Mat Procedure

Glass fiber nonwoven handsheets were prepared with ¾ inch K Fiber wet chop (manufactured by Owens Corning, headquartered in Toledo, Ohio), using approximately 7.6 grams of glass fiber per sheet (1.8 pounds per 100 square feet). The glass fiber was dispersed in water using NALCO 7768 polyacrylamide viscosity modifier (manufactured by Nalco Company, headquartered in Naperville, Ill.), and NALCO 01NM149 Dispersant (manufactured by Nalco Company, headquartered in Naperville, Ill.). Handsheets are formed in a Williams Standard Pulp Testing Apparatus (manufactured by Williams Apparatus Company, headquartered in Watertown, N.Y.), handsheet mold. The wet sheet was transferred to a vacuum station, where it was saturated with the inventive binder compositions (Examples 6-13), and comparative compositions (Examples 14-16) by pouring binder directly onto the wet sheet, and then de-watered by vacuum. The sheets were dried/cured in a forced air oven for 30 seconds at 210° C.

Mechanical Property Testing of Nonwoven Mat

The glass fiber nonwoven handsheets were cut into 1 inch by 5 inch strips for tensile testing. Dry and Hot/Wet Tensile testing was performed on seven strips from each sample using a Thwing-Albert Intellect 500 tensile tester (manufactured by Thwing-Albert Instrument Company, headquartered in West Berlin, N.J.) with a 200 lb. load cell, 1 inch/min. crosshead speed, 20% sensitivity, and a 3 inch gap. Dry tensile testing was performed on the prepared strips. Hot/Wet tensile strength testing was performed after soaking strips for 10 minutes in 85° C. water and then testing immediately after removal of the strips, while they were still wet. Hot/Dry tensile testing was performed on the prepared strips using an Instron 4201 tensile tester manufactured by Instron, headquartered in Norwood, Mass.) equipped with a 1 kN load cell and an oven chamber encasing the jaws with a temperature range capability of −100 to 400° F. (−73° C. to 204° C.). The oven chamber of the tensile tester was pre-heated to 302° F. (150° C.) prior to testing. Once pre-heated, the strips were placed in the jaws and the oven chamber was closed and equilibrated back to 302° F. (150° C.). The samples were then pulled apart at a crosshead speed of 1 inches/minute with a 3 inch gap. The results of the testing are shown in Table C.

TABLE C

Mechanical Properties Results

| Binder | Dry TS | Hot/Wet | % Ret | Hot/Dry |
|---|---|---|---|---|
| Ex. 4 | 29 | 27 | 93 | 12 |
| Ex. 5 | 28 | 27 | 96 | 10 |
| Ex. 6 | 28 | 23 | 82 | 8 |
| Ex. 7 | 30 | 26 | 87 | 9 |
| Ex. 8 | 24 | 24 | 100 | 7 |
| Ex. 9 | 29 | 27 | 93 | 12 |
| Ex. 10 | 26 | 27 | 100 | 14 |
| Ex. Comp. 11 | 28 | 20 | 71 | 8 |
| Ex. Comp. 12 | 24 | 17 | 71 | 10 |
| Ex. Comp. 13 | 28 | 21 | 75 | 6 |
| Ex. Comp. 14 | 27 | 21 | 78 | 14 |

NOTE:
All tensile values are reported in lbs/in.

We claim:

1. A binder composition consisting essentially of:
    a. at least one polycarboxy emulsion copolymer comprising as copolymerized units from 12% to 20% by weight of a carboxy acid monomer,
        wherein said copolymer has a measured glass transition temperature (Tg) of from 40° C. to 70° C., and a total weight solids of no less than 40%; and
    b. at least one polyol crosslinker having a molecular weight of less than 700,
    wherein said polyol crosslinker comprises a primary hydroxy group and at least one additional hydroxy group, wherein the ratio of primary hydroxy group equivalents to carboxy group equivalents is from 0.25:1 to 2.0:1, and
    further wherein the composition does not include any polymers containing less than 10% by weight of a carboxy acid monomer.

2. The binder composition of claim 1 wherein said carboxy acid monomer is selected from the group consisting of acrylic acid and methacrylic acid.

3. The binder composition of claim 1 wherein said polycarboxy emulsion copolymer has a weight average molecular weight of from 5,000 to 1,000,000.

4. The binder composition as claimed in claim 3, wherein the polycarboxy emulsion copolymer has a weight average molecular weight of from 30,000 to 600,000.

5. The binder composition of claim 1 wherein said polycarboxy emulsion copolymer has a particle size of from 50 to 300 nm.

6. The binder composition of claim 1 further comprising at least one low molecular weight polybasic carboxylic acid, anhydride or salt thereof having a molecular weight of 1000 or less.

7. The binder composition as claimed in claim 1, wherein the ratio of primary hydroxy group equivalents to carboxy group equivalents is from 0.4:1 to 1.75:1.

8. A nonwoven mat comprising nonwoven fibers bound by a binder composition consisting essentially of:
    a. at least one polycarboxy emulsion copolymer comprising as copolymerized units from 12% to 20% by weight of a carboxy acid monomer,
        wherein said copolymer has a measured glass transition temperature (Tg) of from 40° C. to 70° C., and a total weight solids of no less than 40%; and
    b. at least one polyol crosslinker having a molecular weight of less than 700,
    wherein said polyol crosslinker comprises a primary hydroxy group and at least one additional hydroxy group, wherein the ratio of primary hydroxy group equivalents to carboxy group equivalents is from 0.25:1 to 2.0:1, and, further wherein, the composition does not include any polymers containing less than 10% by weight of a carboxy acid monomer.

* * * * *